(12) United States Patent
McNally

(10) Patent No.: US 8,073,438 B2
(45) Date of Patent: Dec. 6, 2011

(54) METHOD AND SYSTEM FOR DISABLING A WIRELESS COMMUNICATION DEVICE

(76) Inventor: Christopher McNally, Traverse City, MI (US)

(*) Notice: Subject to any disclaimer, the term of this patent is extended or adjusted under 35 U.S.C. 154(b) by 371 days.

(21) Appl. No.: 12/477,779

(22) Filed: Jun. 3, 2009

(65) Prior Publication Data
US 2010/0311403 A1    Dec. 9, 2010

(51) Int. Cl.
*H04M 3/00* (2006.01)
(52) U.S. Cl. .................. 455/419; 370/338; 370/401
(58) Field of Classification Search .................. 455/419, 455/411, 517, 575.9, 462; 370/349, 329; 340/539.1, 531, 12.22, 518, 539.11; 380/43, 380/248; 379/29.01; 190/102
See application file for complete search history.

(56) References Cited

U.S. PATENT DOCUMENTS

| | | | |
|---|---|---|---|
| 6,011,973 A | 1/2000 | Valentine et al. | |
| 6,085,096 A | 7/2000 | Nakamura | |
| 6,327,472 B1* | 12/2001 | Westroos et al. | 455/450 |
| 6,393,254 B1 | 5/2002 | Pousada Carballo, et al. | |
| 6,456,822 B1 | 9/2002 | Gofman et al. | |
| 6,496,703 B1 | 12/2002 | da Silva | |
| 6,937,868 B2 | 8/2005 | Himmel et al. | |
| 6,961,579 B2 | 11/2005 | Inukai et al. | |
| 6,967,972 B1* | 11/2005 | Volftsun et al. | 370/466 |
| 6,978,146 B1 | 12/2005 | Yardman | |
| 7,013,134 B2 | 3/2006 | Ikeda | |
| 7,082,467 B2 | 7/2006 | Border et al. | |
| 7,138,936 B2 | 11/2006 | Duff et al. | |
| 7,236,766 B2 | 6/2007 | Freeburg | |
| 7,272,403 B2 | 9/2007 | Creamer et al. | |
| 7,296,503 B1 | 11/2007 | McGrath | |
| 7,400,891 B2 | 7/2008 | Aaron | |
| 2004/0023674 A1* | 2/2004 | Miller | 455/462 |
| 2005/0195109 A1* | 9/2005 | Davi et al. | 342/463 |
| 2006/0128311 A1* | 6/2006 | Tesfai | 455/67.11 |
| 2006/0165073 A1* | 7/2006 | Gopinath et al. | 370/389 |
| 2007/0104157 A1* | 5/2007 | Kawaguchi et al. | 370/338 |
| 2008/0125129 A1* | 5/2008 | Lee | 455/440 |
| 2008/0261522 A1* | 10/2008 | Dankberg et al. | 455/13.1 |
| 2008/0301267 A1* | 12/2008 | Chang et al. | 709/220 |
| 2010/0195499 A1* | 8/2010 | Dattagupta et al. | 370/235 |

* cited by examiner

*Primary Examiner* — Nick Corsaro
*Assistant Examiner* — Mahendra Patel
(74) *Attorney, Agent, or Firm* — Webb IP Law Group; Jason P. Webb; Danny Y. H. Chang

(57) ABSTRACT

A method and system for disabling a wireless communication device, including: capturing a signal stream from the wireless communication device by satisfying a signal control protocol using a mobile broadcast antenna; and routing signals to and from the wireless communication device according to a non-standard protocol, thereby disabling normal operation of the wireless communication device. The mobile broadcast antenna includes a signal capturing module configured to receive information relevant to satisfaction of the signal control protocol and to alter a signal of the mobile broadcast antenna. The signal capturing module detects signal strengths from other broadcast antenna and alters a broadcast strength of the mobile broadcast antenna to be higher than the detected signal strengths. The signal capturing module calculates a desired signal strength difference according to a desired protection characteristic and alters the broadcast strength of the mobile broadcast antenna to satisfy the desired signal strength difference.

24 Claims, 5 Drawing Sheets

METHOD AND SYSTEM FOR DISABLING A WIRELESS COMMUNICATION DEVICE

FIELD OF THE INVENTION

The present invention relates to wireless communication devices. Specifically, methods and systems for disabling wireless communication devices.

DESCRIPTION OF THE RELATED ART

Almost anything can be turned into an improvised explosive device (IED), from grenades to plastic explosives to leftover mines. Remotely detonating these items using relatively simple, readily available, low-technology devices is a common method for setting off an IED. A trigger device can be put together out of the most everyday of electronics—a cellular phone, a garage door opener, a child's remote-control toy.

Cellular phones are fairly common triggers for IEDs. They allow for an easy way to set IEDs off on command and potentially from thousands of miles away. Consequently, the adaptation of using cellular phones has given bombers the standoff ability to watch from a distance and not be compromised. Furthermore, the hiding places for handmade bombs are everywhere: in the ground, in a building, even aboard a car or truck. Accordingly, IEDs are very effective because they can be difficult to detect and to counter.

The traditional method of countering wireless communication devices has been the use of jamming devices. However, traditional jamming devices rely on the use of high power signals and complicated circuitry intended to lock onto signals coming from cell phones, counter them, and try to keep up with changing cell phone frequencies to compensate for interference. In essence, jammers attempt to overpower signals and drown them out with useless noise. Due to the level of complication involved, there is an increased chance of error, as well as legal concerns regarding the jamming of airways that have been purchased by commercial companies for specific use. Also, current and/or traditional jammers do not collect information from the devices they jam, and thereby miss a crucial opportunity to gain information useful in locating those capable of triggering IEDs.

Some improvements have been made in the field. Examples include, but are not limited to, the references described below, which references are incorporated by reference herein:

U.S. Pat. No. 6,496,703, issued to da Silva, discloses an apparatus and method for disabling wireless communication devices establishes a disabling zone. Inside the disabling zone, one or more capabilities of the wireless communication devices are disabled. The wireless communication devices may include cellular phones, beepers, pagers, portable computers, electronic personal attendants, and/or similar wireless devices. In a first embodiment, the zone is formed in conjunction with a power monitoring unit proximate the zone. In a second embodiment, the zone is formed in conjunction with a position monitoring system determining the geographical position of the wireless communication devices. In both the first and second embodiments, the zone may be either geographically fixed or movable.

U.S. Pat. No. 6,011,973, issued to Valentine et al., discloses a method and apparatus for restriction operation of a cellular telephone to well delineated geographical areas. The cellular telephone is equipped with a location device for ascertaining the current geographical location of the cellular telephone. The ascertained geographical location is compared with information pertaining to the allowability of operation of cellular telephones in various geographical locations. A determination is made as to whether the cellular telephone is allowed to operate in its current geographical location. The cellular telephone accordingly enables or disables transmitting by the transceiver of the cellular telephone.

U.S. Pat. No. 6,085,096, issued to Nakamura, discloses a mobile communication system includes a base station having a message transmission function and installed near a place where the use of a mobile unit is restricted. When the mobile unit in a wait state enters an area under management of the base station, the base station transmits a data signal for reproducing a message for instructing the mobile unit to turn off a power supply of the mobile unit.

U.S. Pat. No. 6,937,868, issued to Himmel et al., discloses an apparatus and method for managing a mobile phone answering mode and outgoing message or other indicator based on a location of the mobile phone are provided. The apparatus and method make use of a location system to ascertain the current location of a mobile telephone being carried by a user. Based on the current location, the apparatus and method determine whether operation of the mobile telephone to receive and/or send calls should be restricted. In addition, the apparatus and method determine an appropriate outgoing message to be provided to calling parties while the mobile telephone is located in an area where use of the mobile telephone to receive calls is prohibited. The particular outgoing message provided is customized to the current location of the mobile telephone and optionally, the caller ID of the calling party.

U.S. Pat. No. 6,978,146, issued to Yardman, discloses a device for blocking cellular phone signals includes a housing having a substantially rectangular shape and further includes a transceiver disposed therein for detecting a cellular phone signal. The transceiver generates a blocking signal to temporarily disable a cellular phone and thereby prevent a user from operating a cellular phone within a predetermined area. The housing further has a top surface and a bottom surface including an antenna connected thereto and for directing the blocking signal outwardly and away therefrom. The device further includes a power supply source including a rechargeable battery pack for providing power to the device and a control lever connected to the housing and operably connected to the transceiver for selectively adjusting the strength of the blocking signal as desired by a user.

U.S. Pat. No. 6,393,254, issued to Carballo et al., discloses a disabler for mobile communications. The object of the call masking system for mobile telephones is to prevent the operation of mobile telephones which are present in a closed environment without interfering with the normal operation of other telephones which are outside the closed environment. To this effect, the system generates interference signals which will prevent the mobile telephones from receiving the signaling channels sent by the base stations (for example, GSM cal signaling channel). The system monitors the power with which the carriers of the neighboring base stations are received inside the room and will adjust the interference power radiating in the signaling channels so that the carrier to interference signal ratio will make the operation of the mobile telephones impossible. The system can be applied to closed environments wherein mobile telephones should not ring when receiving a call.

U.S. Pat. No. 6,456,822, issued to Gofman et al., discloses a method and device for achieving reliable prevention of cellular telephone calls, within a given area. In the preferred embodiment, the device and method operate to block the control frequencies of the cellular system within a given area.

The device broadcasts a blocking signal with a low power output, which interferes with reception ability and decoding of signals and commands broadcast at the control frequency. Thus the handshake routine of the telephone/cellular subscriber with the local cellular system is prevented. Operation of the device is achieved in several ways, manually, automatically, and/or by remote control. Its operation prevents cellular communication ability by subscribers within the area or within the effective blocking range, which is derived from the effective radiated power (ERP) of the blocking signal, its type and the type of communications/or blocked system. Using the inventive device, a given area normally accessible by cellular communications is blocked from such access, thus providing a security-related, cultural or other safeguard. The given area is thereby isolated from cellular communications, and access can only be achieved by physically relocating the user of a blocked cellular telephone.

The inventions heretofore known suffer from a number of disadvantages, which include: being difficult to use, being expensive, not interfering with limited frequency range, requiring compensation for interference, not anticipating frequency changes as a wireless communication device attempts to locate a stronger signal, not being able to obtain and record identification information of wireless communication devices, and/or not being able to authorize use of approved wireless communication devices.

Accordingly, there exists a need for a method and system for disabling a wireless communication device that solves one or more of the problems herein described or that may come to the attention of one skilled in the art after becoming familiar with this specification.

SUMMARY OF THE INVENTION

The present invention has been developed in response to the present state of the art, and in particular, in response to the problems and needs in the art that have not yet been fully solved by currently available wireless communication systems, methods and devices. Accordingly, the present invention has been developed to provide a system, method, and device for mobile interference and/or spoofing of wireless communication.

In one embodiment of the invention, there may be a method of disabling a wireless communication device, which may include the following steps: capturing a signal stream from the wireless communication device which may satisfy a signal control protocol using a mobile broadcast antenna; and/or routing signals to and/or from the wireless communication device which may be according to a non-standard protocol, which may thereby disable normal operation of the wireless communication device. In another embodiment of the invention, the mobile broadcast antenna may include a signal capturing module, which may be configured to receive information relevant to satisfaction of the signal control protocol and/or to alter a signal of the mobile broadcast antenna. In still another embodiment of the invention, the signal capturing module may detect signal strengths from other broadcast antenna and/or alter a broadcast strength of the mobile broadcast antenna to be higher than the detected signal strengths.

In yet another embodiment of the invention, the signal capturing module may calculate a desired signal strength difference which may be according to a desired protection characteristic and/or alter the broadcast strength of the mobile broadcast antenna which may be to satisfy the desired signal strength difference. In still yet another embodiment of the invention, the mobile broadcast antenna may be coupled to a powered vehicle. In even another embodiment of the invention the step of routing signals may include not retransmitting any signals from the wireless communication device and/or not sending any externally generated signals to the wireless communication device. In even still another embodiment of the invention, the step of routing signals may include not sending any externally generated signals to the wireless communication device.

In even yet another embodiment of the invention, the method of disabling a wireless communication device may include the steps of: registering the wireless communication device; and/or recording signal information which may be related to the registered wireless communication device. In an additional embodiment of the invention, the method of disabling a wireless communication device may include the step of registering the wireless communication device in a memory device which may be in association with selectable metadata. In still an additional embodiment of the invention, the non-standard protocol may route signals according to the selectable metadata.

In yet an additional embodiment of the invention, there may be a system for disabling a wireless communication device, which may include: a mobile broadcast antenna, which may be configured to broadcast signals, which may include: a signal capturing module, which may be configured to capture a signal stream from the wireless communication device; and/or a signal control protocol satisfaction module, in communication with the signal capturing module, which may be configured to satisfy a signal control protocol; and/or a signal routing module, in communication with the mobile broadcast antenna, which may be configured to route signals to and/or from the wireless communication device, which may include a non-standard protocol disabling module, which may be configured to disable the wireless communication device according to a non-standard protocol. In still yet an additional embodiment of the invention, the signal capturing module may include: an information receiving module, which may be configured to receive information relevant to satisfaction of the signal control protocol; and/or a signal altering module, in communication with the information receiving module, which may be configured to alter a signal of the mobile broadcast antenna. In even an additional embodiment of the invention, the signal capturing module may include a signal strength detection module, in communication with the signal altering module, which may be configured to detect signal strengths from other broadcast antenna.

In even still an additional embodiment of the invention, the signal capture module may include a signal strength difference calculating module, in communication with the signal altering module, which may be configured to calculate a desired signal strength difference according to a desired protection characteristic. In even yet an additional embodiment of the invention, the mobile broadcast antenna may be coupled to a powered vehicle. In a further embodiment of the invention, the non-standard protocol disabling module may include a signal blocking module, which may be configured to prevent the transmission of signals to and/or from the wireless communication device.

In still a further embodiment of the invention, the system for disabling a wireless communication device may include: a registration processing module, in communication with the signal routing module, which may be configured to register the wireless communication device in a memory device; and/or a signal information recording module, in communication with the registration processing module, which may be configured to record signal information related to the registered wireless communication device. In yet a further embodiment of the invention, the wireless communication device may be registered in a memory device which may be in association with selectable metadata. In still yet a further embodiment of the invention the non-standard protocol disabling module may route signals according to the selectable metadata.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments that are illustrated in the appended drawings. Understanding that these drawings depict only typical embodiments of the invention and are not, therefore, to be considered to be limiting of its scope, the invention will be described and explained with additional specificity and detail through the use of the accompanying drawings, in which.

DETAILED DESCRIPTION OF THE INVENTION

Figure 1:
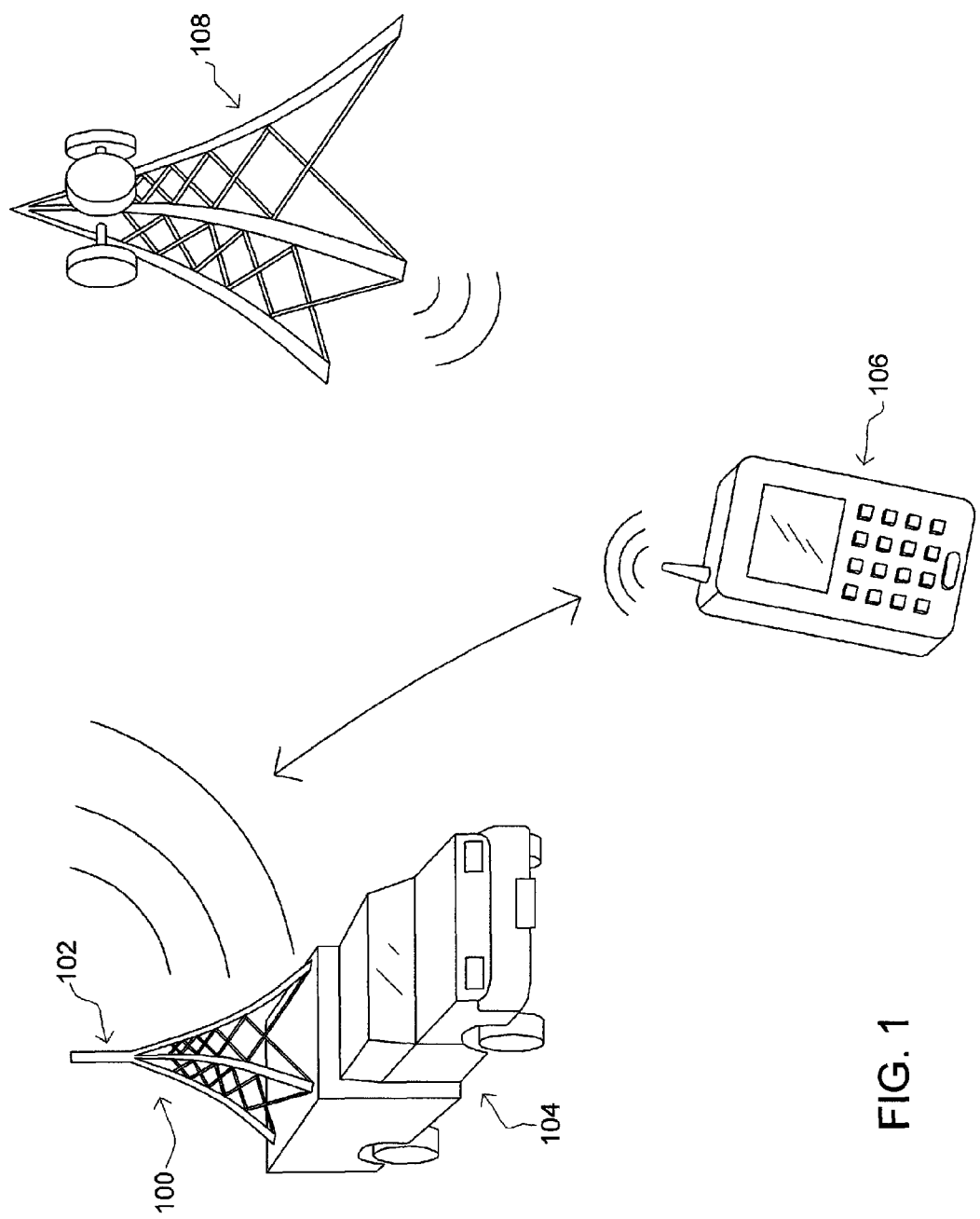
FIG. 1 is a perspective view of a system for disabling a wireless communication device in operation, according to one embodiment of the invention.

For the purposes of promoting an understanding of the principles of the invention, reference will now be made to the exemplary embodiments illustrated in the drawings, and specific language will be used to describe the same. It will, nevertheless, be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Reference throughout this specification to an "embodiment," an "example" or similar language means that a particular feature, structure, characteristic, or combinations thereof described in connection with the embodiment is included in at least one embodiment of the present invention. Thus, appearances of the phrases an "embodiment," an "example," and similar language throughout this specification may, but do not necessarily, all refer to the same embodiment, to different embodiments, or to one or more of the figures. Additionally, reference to the wording "embodiment," "example" or the like, for two or more features, elements, etc. does not mean that the features are necessarily related, dissimilar, the same, etc.

Each statement of an embodiment or example is to be considered independent of any other statement of an embodiment despite any use of similar or identical language characterizing each embodiment. Therefore, where one embodiment is identified as "another embodiment," the identified embodiment is independent of any other embodiments characterized by the language "another embodiment." The features, functions, and the like described herein are considered to be able to be combined in whole or in part one with another as the claims and/or art may direct, either directly or indirectly, implicitly or explicitly.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of programmable or executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module and/or a program of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The various system components and/or modules discussed herein may include one or more of the following: a host server or other computing systems including a processor for processing digital data; a memory coupled to said processor for storing digital data; an input digitizer coupled to the processor for inputting digital data; an application program stored in said memory and accessible by said processor for directing processing of digital data by said processor; a display device coupled to the processor and memory for displaying information derived from digital data processed by said processor; and a plurality of databases. Various databases used herein may include: metadata, signal data, user identification data, device registration data, wireless communication data and/or like data useful in the operation of the present invention. As those skilled in the art will appreciate, any computers discussed herein may include an operating system (e.g., Windows Vista, NT, 95/98/2000, OS2; UNIX; Linux; Solaris; MacOS; and etc.) as well as various conventional support software and drivers typically associated with computers. The computers may be in a home or business environment with access to a network. In an exemplary embodiment, access is through the Internet through a commercially-available web-browser software package.

The present invention may be described herein in terms of functional block components, screen shots, user interaction, optional selections, various processing steps, and the like. Each of such described herein may be one or more modules in exemplary embodiments of the invention. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, Visual Basic, SQL Stored Procedures, AJAX, extensible markup language (XML), with the various algorithms being implemented with any combination of data structures, objects, processes, routines or other programming elements. Further, it should be noted that the present invention may employ any number of conventional techniques for data transmission, signaling, data processing, network control, and the like. Still further, the invention may detect or prevent security issues with a client-side scripting language, such as JavaScript, VBScript or the like.

Additionally, many of the functional units and/or modules herein are described as being "in communication" with other functional units and/or modules. Being "in communication" refers to any manner and/or way in which functional units and/or modules, such as, but not limited to, computers, laptop computers, PDAs, modules, and other types of hardware and/or software, may be in communication with each other. Some non-limiting examples include communicating, sending, and/or receiving data and metadata via: a network, a wireless network, software, instructions, circuitry, phone lines, internet lines, satellite signals, electric signals, electrical and magnetic fields and/or pulses, and/or so forth.

As used herein, the term "network" may include any electronic communication means which incorporates both hardware and software components of such. Communication among the parties in accordance with the present invention may be accomplished through any suitable communication channels, such as, for example, a telephone network, an extranet, an intranet, Internet, point of interaction device (point of sale device, personal digital assistant, cellular phone, kiosk, etc.), online communications, off-line communications, wireless communications, transponder communications, local area network (LAN), wide area network (WAN), networked or linked devices and/or the like. Moreover, although the invention may be implemented with TCP/IP communications protocols, the invention may also be implemented using IPX, Appletalk, IP-6, NetBIOS, OSI or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997), the contents of which are hereby incorporated by reference.

FIG. 1 illustrates a system for disabling a wireless communication device, according to one embodiment of the invention. As shown, the system includes a mock cellular phone tower 100 with a mobile broadcast antenna 102. The mock cellular phone tower 100 and mobile broadcast antenna 102 are coupled to a powered vehicle 104. In addition, the mock cellular phone tower 100 is in communication with a wireless communication device 106, or cellular phone, and a cellular phone tower 108.

In operation, the mock cellular phone tower travels to the vicinity of the wireless communication device and the cellular phone tower. The mock cellular phone tower generates a signal sufficient to establish itself as a preferred tower for the wireless communication device and to maintain that as a substantially exclusive communication channel with the wireless communication device. The mock cellular phone tower may then interfere with communication to and from the wireless communication device as desired. Accordingly, the mock cellular phone tower may be used to disable wireless communication devices intended to be used to cause harm during critical moments when damage from the device (such as but not limited to by means of explosive devices coupled thereto) would be high.

Advantageously, operation of the mock cellular phone tower operates according to the protocol of the wireless device and/or over a control frequency known to the wireless device. Accordingly, the device is complicit in its own disabling and is not alerted to any problems because it does not detect an undesired change or loss of signal. This is advantageous because such could trigger an IED.

Figure 2:
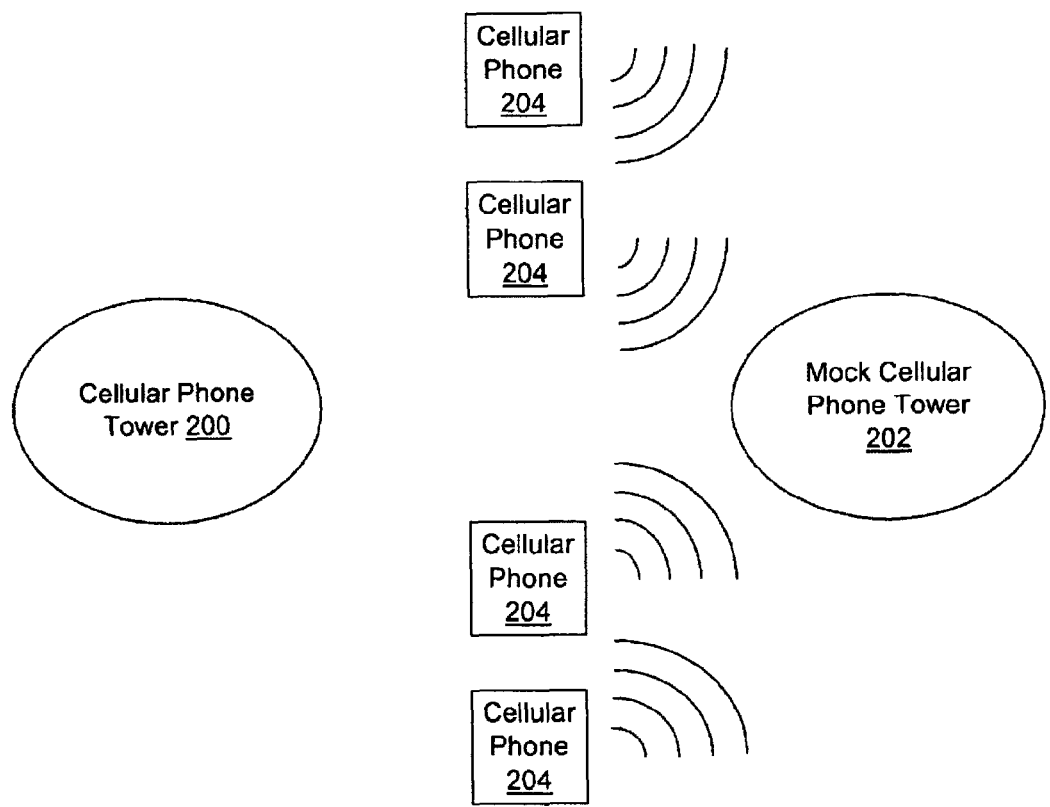
FIG. 2 illustrates a block diagram of a system for disabling a wireless communication device, according to one embodiment of the invention.

FIG. 2 also illustrates a system for disabling a wireless communication device, according to one embodiment of the invention. There is illustrated a cellular phone tower 200, a plurality of cellular phones 204, and a mock cellular phone tower 206. As illustrated, the plurality of cellular phones 204 provide signals to the mock cellular phone tower 206, rather than the cellular phone tower 200. The mock cellular phone tower may or may not be aware of each device depending on the communication protocols used. For example, where a control protocol may rely entirely on signal strength, a mock tower may consist of a signal generation module sufficient to produce a signal of sufficient strength and character to cause all cell phones within an effective radius to direct all communication to such tower, even though the tower may have no reception and/or signal processing capabilities.

In operation of one embodiment of the invention, a mock cellular phone tower 100, 206 is mounted on a powered vehicle 104, such as a bomb squad vehicle. The powered vehicle 104 then transports the mock cellular phone tower 100, 206 to an area threatened by an improvised explosive device (IED). Upon arrival to the area or as a continuous function during travel, the mock cellular phone tower 100, 206 mimics a cellular phone tower 108, 200 so that wireless communication devices 106 in the area, such as cellular phones 204, provide signals to the mock cellular phone tower 206, rather than the cellular phone tower 200 or IED, thereby preventing detonation of the IED since the cell phone will either not notice a change or receive a detonation signal or will ignore it as not coming from the appropriate tower.

Figure 3:
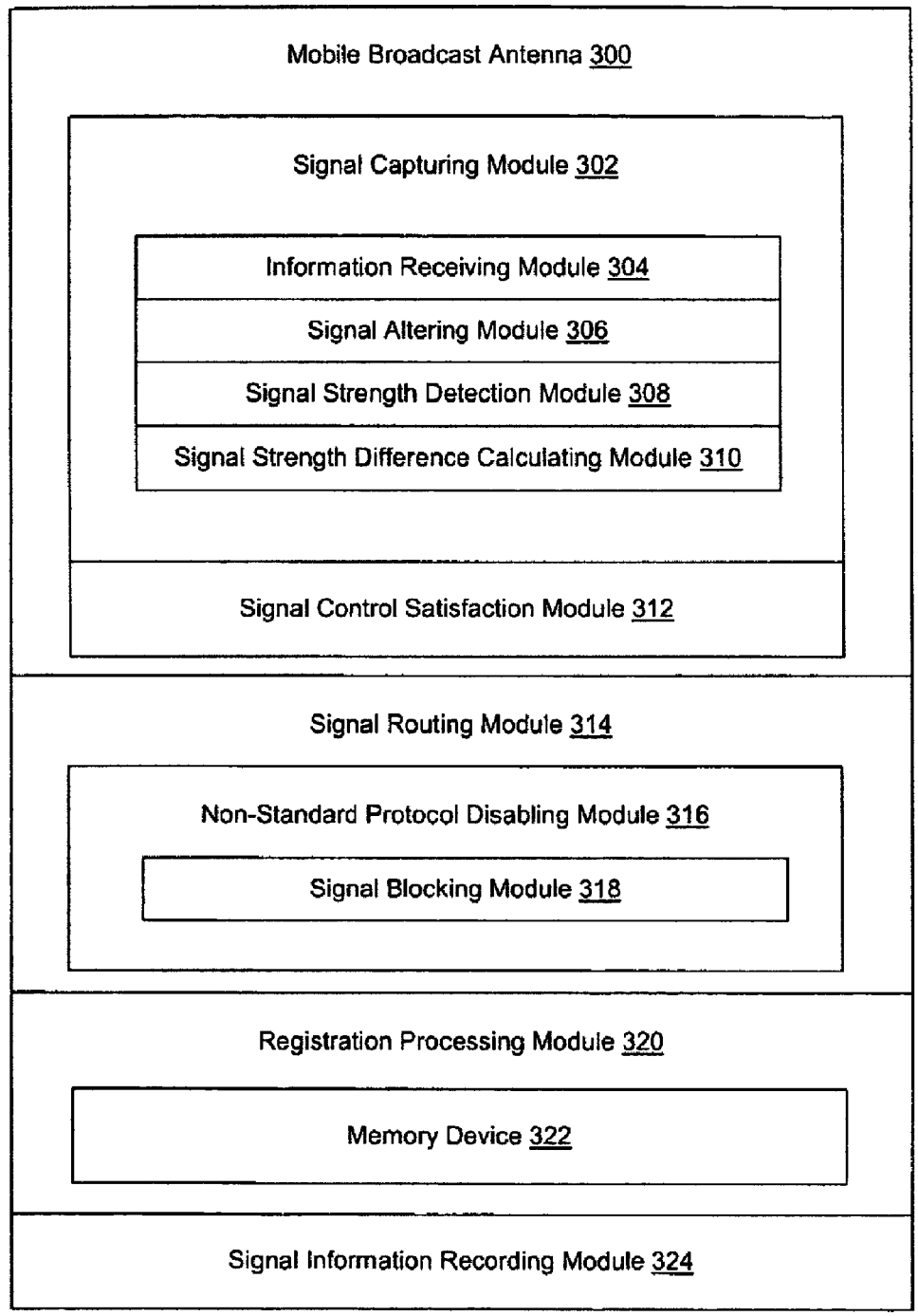
FIG. 3 illustrates a block diagram of a system for disabling a wireless communication device, according to one embodiment of the invention.

FIG. 3 further illustrates a system for disabling a wireless communication device, according to one embodiment of the invention. As shown, the system includes a mobile broadcast antenna 300, including a signal capturing module 302. The mobile broadcast antenna 300 may be any apparatus or system configured to broadcast signals, such as, but not limited to the method and apparatus for reception of mobile broadcast of U.S. Patent Application Publication No. 2007/0197174, by Yong-Deok Kim, which is incorporated by reference herein for its supporting teachings. Accordingly, the mobile broadcast antenna 300 may be part of a mock cellular phone tower, which is designed to mimic a cellular phone tower such as the tree styled monopole tower of U.S. Pat. No. 6,286,266, issued to Popowych et al., which is incorporated by reference herein for its supporting teachings. Furthermore, the mobile broadcast antenna 300 may be coupled to a powered vehicle, such as the truck of the method and apparatus for neutralizing improvised explosive devices of U.S. Pat. No. 7,296,503, issued to McGrath, which is incorporated by reference herein for its supporting teachings.

The signal capturing module 302 is shown to include: an information receiving module 304, a signal altering module 306, a signal strength detection module 308, and a signal strength difference calculating module 310. The information receiving module 304 may be any apparatus or system configured to receive information relevant to satisfaction of the signal control protocol. For example, the information receiving module 304 may receive information, such as, but not limited to, cellular phone tower signal output and/or signal strength. Thus, the information receiving module 304 may be such as the wireless communication device and signal detection circuit of U.S. Patent Application Publication No. 2009/0061780, by Sekiya et al., which is incorporated by reference herein for its supporting teachings.

The signal altering module 306 may be any apparatus or system configured to alter a signal of the mobile broadcast antenna 300, such as by increasing signal strength of the mobile broadcast antenna. As a result, the signal altering module may be such as the apparatus and method for frequency shifting of a wireless signal and systems using frequency shifting of U.S. Patent Application Publication No. 2008/0146146, by Binder et al., which is incorporated by reference herein for its supporting teachings. The signal strength detection module 308 may by any apparatus or system configured to detect signal strengths from other broadcast antenna, or other cellular phone towers. Accordingly, the signal strength detection module 308 may be such as the wireless communication device and signal detection circuit of U.S. Patent Application Publication No. 2009/0061780, by Sekiya et al., which is incorporated by reference herein for its supporting teachings.

The signal strength difference calculating module 310 is configured to calculate a desired signal strength difference according to a desired protection characteristic. For example, the signal strength difference calculating module 310 may calculate a difference in signal strengths between the mobile broadcast antenna 300 and other broadcast antennas based on a desired protection characteristic of the area to be protected, such as, but not limited to: a protection distance, such as radius; a minimum protection buffer; protocol requirement; period of time; and the like. For instance, the signal strength difference calculating module 310 may calculate a difference in broadcast signal strengths between the mobile broadcast antenna 300 and other broadcast antennas within a radius to be protected from an IED. Advantageously, the mobile broadcast antenna 300 does not have to anticipate frequency changes as a cellular phone attempts to locate stronger signals and/or compensate for interference.

In addition, the signal strength difference calculating module 310 may calculate a minimum protection buffer for providing a buffer by increasing the strength of a signal of the broadcast antenna 300 to compensate for any error. For these reasons, the signal strength difference calculating module 310 may include features or functions of U.S. Pat. No. 6,330,450, issued to Wallstedt and Ward, which is incorporated by reference herein for its supporting teachings. Accordingly, the signal capturing module 302 is configured to capture a signal stream from a wireless communication device by providing a signal from the mobile broadcast antenna 300 which is stronger and preferable over other broadcasting antenna in a network provision area. Therefore, the signal capturing module 302 captures a signal stream from the wireless communication device by satisfying a signal control protocol.

In addition, the mobile broadcast antenna 300 includes a signal control protocol satisfaction module 312. The signal control protocol satisfaction module 312 is configured to satisfy a signal control protocol, such as, but not limited to: providing a signal, providing a signal having the greatest strength and/or repeating a signal to a wireless communication device. Hence, the signal control protocol satisfaction module 312 may be such as the apparatus and method for frequency shifting of a wireless signal and systems using frequency shifting of U.S. Patent Application Publication No. 2008/0146146, issued to Binder et al., which is incorporated by reference herein for its supporting teachings.

The system is illustrated to further include a signal routing module 314. The signal routing module 314 is configured to route signals to and from the wireless communication device. For instance, the signal routing module 314 may route signals to and from the wireless device according to a non-standard protocol, which may override the wireless communication device such as by disabling the device and blocking signals transmitted to and from the wireless communication device. Accordingly, the signal routing module 314 is shown to include a non-standard protocol disabling module 316, including a signal blocking module 318.

Moreover, the non-standard protocol disabling module 316 is configured to disable the wireless communication device according to a non-standard protocol, and the signal blocking module 318 is configured to prevent the transmission of signals to and from the wireless communication device. Additionally, the non-standard protocol disabling module 316 may route signals according to selectable metadata, such as, but not limited to: a wireless communication device registration number and/or other user information. For these reasons, the signal routing module 314, the non-standard protocol disabling module 316, and the signal blocking module 318, may each include features and functions of the following, which are incorporated by reference herein: U.S. Pat. No. 6,496,703, issued to da Silva; U.S. Pat. No. 6,011,973, issued to Valentine et al.; U.S. Pat. No. 6,085,096, issued to Nakamura; U.S. Pat. No. 6,961,579, issued to Hisamori; and U.S. Pat. No. 6,937,868, issued to Himmel et al.

Finally, the system is shown to include a registration processing module 320, with a memory device 322; and a signal information recording module 324. The registration processing module 320 is configured to register the wireless communication device in a memory device 322. For instance, the registration processing module 320 may be a central processing unit, or CPU, such as the Intel Pentium 4 3.0 GHz Socket 775 CPU, by Intel Corporation of Santa Clara, Calif. Accordingly, the memory device 322 may be a USB flash drive, such as the Aluminum 8 GB Flash Drive, by GNP Specialties, Inc., of Nesconset, N.Y. Accordingly, the wireless communication device may be registered in a memory device 322 according to selectable metadata, such as, but not limited to: a wireless communication device registration number and/or other user information.

Further, the signal information recording module 324 is configured to record signal information related to the registered wireless communication device. Hence, the registration processing module 320 and the signal information recording module 324 may be such as the methods and systems to meter media content presented on a wireless communication device of U.S. Patent Application Publication No. 2008/0126420, by Wright et al., which is incorporated by reference herein for its supporting teachings. Advantageously, identification, or registration, information of the wireless devices within a signal network may be obtained and recorded. Additionally, the signal routing module 314 may authorize certain cellular phones to use full service based in identification information.

Figure 4:
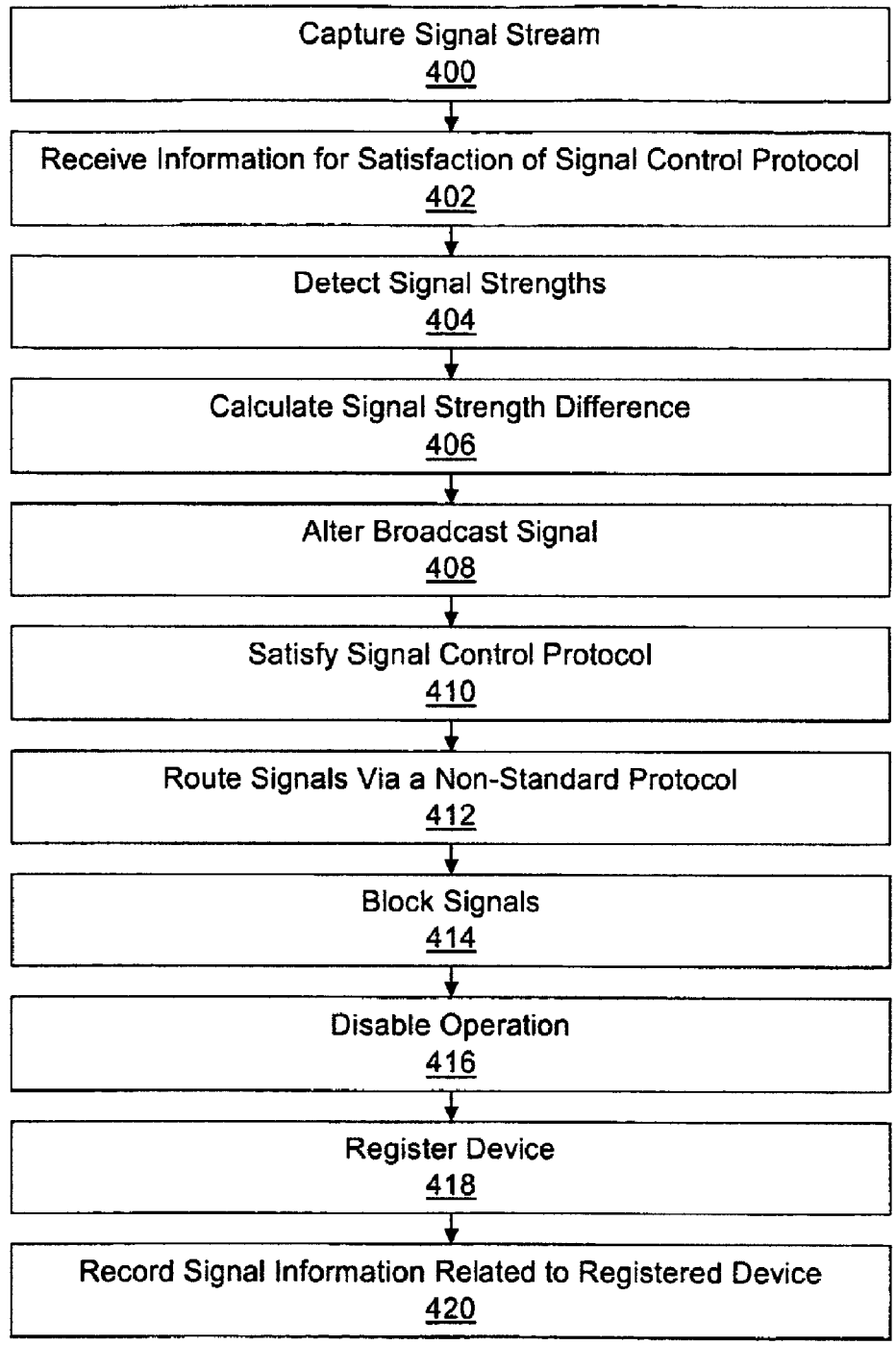
FIG. 4 illustrates a flowchart of a method of disabling a wireless communication device, according to one embodiment of the invention.

FIG. 4 illustrates a method of disabling a wireless communication device, according to one embodiment of the invention. First, a mobile broadcast antenna 300 captures 400 a signal stream from the wireless communication device. For example, the mobile broadcast antenna 300 may capture 400 the signal stream by a transmission of a signal to the wireless communication device which has greater strength and/or availability than signals provided by other cellular phone towers.

As a result, the mobile broadcast antenna 300 may include a signal capturing module 302 configured to receive information relevant to satisfaction of the signal control protocol 402 and to alter a signal of the mobile broadcast antenna 408. For instance, the signal capturing module 302 may receive information 402, such as signal strength provided by other cellular phone towers, to overpower such signals and thereby satisfy signal control protocol 410. Therefore, the signal capturing module 302 also detects signal strengths 404 and calculates signal strength differences 406 in order to alter a broadcast signal 408 to be higher than the detected signal strengths. In addition, the signal capturing module calculates a desired signal strength difference 406 according to a desired protection characteristic and alters the broadcast strength of the mobile broadcast antenna 408 to satisfy the desired signal strength difference 410. For example, the signal capturing module may calculate 406 according to a protection characteristic such as, but not limited to distance and/or time. Thereby, the mobile broadcast antenna 300 satisfies signal control protocol 410.

Then, a signal routing module 314 routes signals to and from the wireless communication device according to a non-standard protocol 412, thereby blocking signals to and from the wireless communication device 414 and/or disabling normal operation of the wireless communication device 416. For example, the step of routing signals to and from the wireless communication device according to a non-standard protocol 412 may include not retransmitting any signals from the wireless communication device and not sending any externally generated signals to the wireless communication device, or blocking signals to and from the wireless communication device 414. Also, the method includes: registering the wireless communication device 418; and recording signal information related to the registered wireless communication device 420. For example, the wireless communication device may be registered in a memory device in association with selectable metadata 418. Accordingly, the non-standard protocol may route signals according to the selectable metadata 412.

Figure 5:
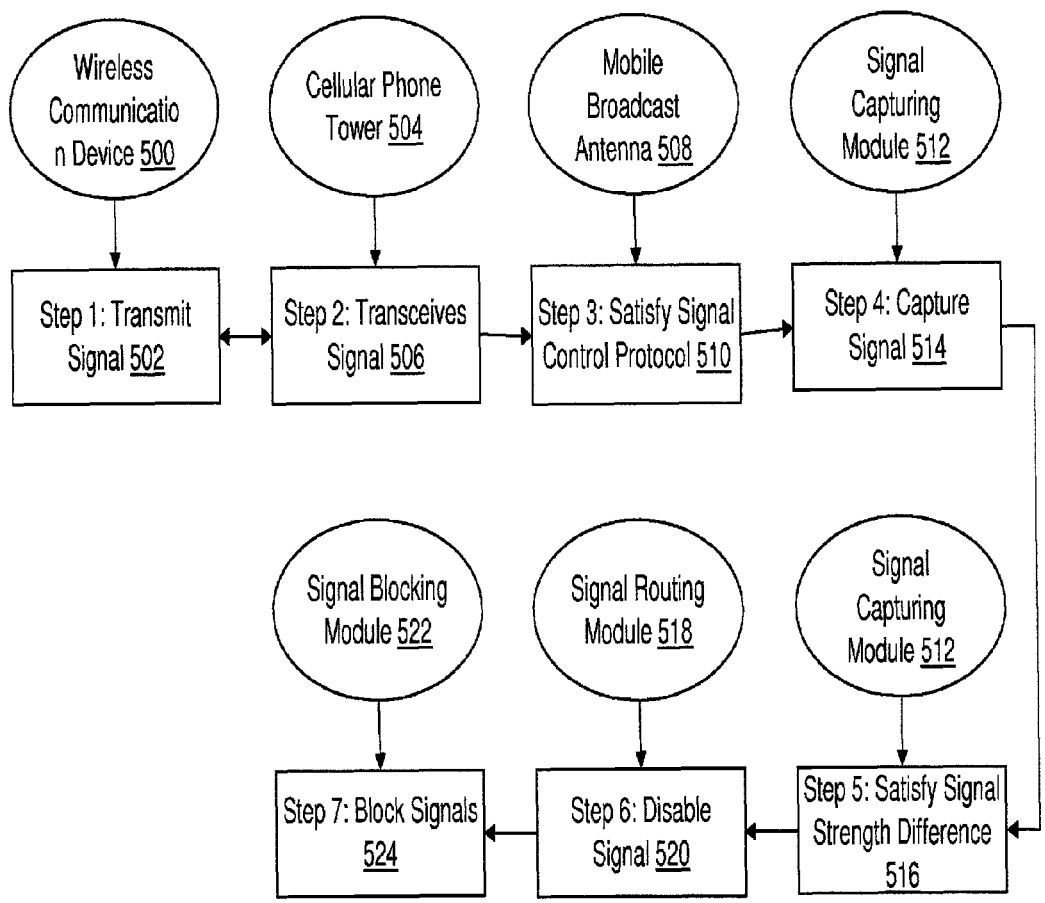
FIG. 5 illustrates a sequence diagram of a method and system for disabling a wireless communication device, according to one embodiment of the invention.

FIG. 5 illustrates the operation of one embodiment of the invention as a sequence diagram. As illustrated, a wireless communication device 500 transmits a signal 502, and a cellular phone tower 504 receives and transmits signals 506. Then, a mobile broadcast antenna 508 satisfies a signal control protocol 510 of the cellular phone tower 504. Next, a signal capturing module 512 of the mobile broadcast antenna 508 captures the signal from the cellular phone 502, and satisfies a signal strength difference 516 between the cellular phone tower 504 and the mobile broadcast antenna 508. A signal routing module 518 then disables 520 the signal from the cellular phone 502. Finally, a signal blocking module 522 blocks signals 524 to and from the cellular phone 502.

The following prophetic example illustrates a mode of operation of an embodiment of the invention:

EXAMPLE

In one prophetic example, a bomb squad would arrive on-scene of a suspected IED, and has reason to believe it can be triggered by a cell phone. They turn on the device which boots up, then listens and logs nearby cell phone towers, wireless transmitters, devices, and cell phones gathering information such as signal strength, network protocols, ESNs, and (if possible) location. This information would be displayed on a computer or similar readout. At this point, the MCPT would transmit via control frequencies at a strong enough strength for the desired device/devices to link to it, and be captured within that network. Once that occurs the device or cell phone can no longer send or receive calls, but doesn't register this fact, since to the device it appears to be connected to a normal/standard network. Additional features could allow for the user of the MCPT to authorize specific devices to be relayed and connected to a nearby tower and function normally (thereby allowing first responders or specific individuals to retain the ability to communicate).

From a forensic standpoint, cell phones can be destroyed during disarming of IEDs, or if it goes off. Advantageously, by collecting the ESN and other data from the phone, the MCPT allows investigators to request more specific warrants increasing the chances of locating anyone who had purchased the device or attempted to call or had received calls from that phone. It makes a successful apprehension more likely, and limits the invasion of privacy and considerable man-hours that would come from requesting all phone records from phone towers in an area during a specific timeframe. Also, the MCPT only disrupts communications within a limited radius, and is less obtrusive that normal jammers. The MCPT could also be useful in tactical situations (such as hostage situations) where law enforcement may wish to control or lock down communications within a small area.

Advantageously, an embodiment of the invention may operate without alerting the wireless communication device to its function. The wireless device may believe that the mobile tower is "real" or otherwise authorized and legitimate. Accordingly, the device may be disabled but unaware. This may prevent unwanted consequences from such devices.

It is understood that the above-described preferred embodiments are only illustrative of the application of the principles of the present invention. The present invention may be embodied in other specific forms without departing from its spirit or essential characteristics. The described embodiment is to be considered in all respects only as illustrative and not restrictive. The scope of the invention is, therefore, indicated by the appended claim rather than by the foregoing description. All changes which come within the meaning and range of equivalency of the claims are to be embraced within their scope.

For example, although the figures illustrate a cellular phone 106, it is understood that any wireless signaling device in the art may be used, such as, but not limited to: garage door openers, keyless entries, computers, and personal digital assistants. Similarly, although the figures show a mock cellular phone tower 102 coupled to a powered vehicle, it is envisioned that the mock cellular phone tower 102 may also be stationary, or at a fixed location. Moreover, it is expected that the system and method may capture wireless signals from any wireless signal transmitting device, such as, but not limited to: cellular phones, cellular phone towers, and satellites.

Finally, it is envisioned that the components of the system may be constructed of a variety of materials. For example, the system may include materials, such as, but not limited to: metal, glass, plastic, rubber, wood, and combinations thereof.

Thus, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims. Further, it is contemplated that an embodiment may be limited to consist of, or to consist essentially of, one or more of the functions, features, structures, and/or methods described herein.

What is claimed is:

1. A method of disabling a wireless communication device using a signal capturing receiver, comprising the following steps:
    capturing a signal stream from the wireless communication device by satisfying a signal control protocol using a mobile broadcast antenna;
    wherein the mobile broadcast antenna includes a signal capturing module configured to receive information relevant to satisfaction of the signal control protocol and to alter a signal of the mobile broadcast antenna;
    wherein the signal capturing module detects signal strengths from other broadcast antenna and alters a broadcast strength of the mobile broadcast antenna to be higher than the detected signal strengths;
    wherein the signal capturing module calculates a desired signal strength difference according to a desired protection characteristic and alters the broadcast strength of the mobile broadcast antenna to satisfy the desired signal strength difference;
    wherein the mobile broadcast antenna is coupled to a powered vehicle;
    wherein the step of routing signals comprises not retransmitting any signals from the wireless communication device and not sending any externally generated signals to the wireless communication device;
    and routing signals to and from the wireless communication device according to a non-standard protocol, thereby disabling normal operation of the wireless communication device.

2. The method of claim 1, wherein the non-standard protocol is a predefined custom protocol.

3. The method of claim 1, further comprising the steps of: registering the wireless communication device; and recording signal information related to the registered wireless communication device.

4. The method of claim 1, further comprising the step of registering the wireless communication device in a memory device in association with selectable metadata.

5. The method of claim 4, wherein the non-standard protocol routes signals according to the selectable metadata.

6. A system for disabling a wireless communication device using a signal capturing receiver, comprising:
    a mobile broadcast antenna, configured to broadcast signals, including:
        a signal capturing module, configured to capture a signal stream from the wireless communication device;
        wherein the signal capturing module includes:
            an information receiving module, configured to receive information relevant to satisfaction of the signal control protocol;
    and
        a signal altering module, in communication with the information receiving module, configured to alter a signal of the mobile broadcast antenna;
        wherein the signal capturing module includes a signal strength detection module, in communication with the signal altering module, configured to detect signal strengths from other broadcast antenna;
        wherein the signal capture module includes a signal strength difference calculating module, in communication with the signal altering module, configured to calculate a desired signal strength difference according to a desired protection characteristic;
    and
    a signal control protocol satisfaction module, in communication with the signal capturing module, configured to satisfy a signal control protocol;
    and
    wherein the mobile broadcast antenna is coupled to a powered vehicle;
    wherein the step of routing signals comprises not retransmitting any signals from the wireless communication device and not sending any externally generated signals to the wireless communication device;
    and
    a signal routing module, in communication with the mobile broadcast antenna, configured to route signals to and from the wireless communication device, and including:
        a non-standard protocol disabling module, configured to disable the wireless communication device according to a non-standard protocol.

7. The system of claim 6, wherein the non-standard protocol disabling module includes a signal blocking module, configured to prevent the transmission of signals to and from the wireless communication device.

8. The system of claim 6, further comprising:
    a registration processing module, in communication with the signal routing module, configured to register the wireless communication device in a memory device; and
    a signal information recording module, in communication with the registration processing module, configured to record signal information related to the registered wireless communication device.

9. The system of claim 8, wherein the wireless communication device is registered in a memory device in association with selectable metadata.

10. The system of claim 9, wherein the non-standard protocol disabling module routes signals according to the selectable metadata.

11. A method of disabling a wireless communication device using a signal capturing receiver, comprising the following steps:

capturing a signal stream from the wireless communication device by satisfying a signal control protocol using a mobile broadcast antenna;
wherein the mobile broadcast antenna is coupled to a powered vehicle; and
routing signals to and from the wireless communication device according to a non-standard protocol, thereby disabling normal operation of the wireless communication device;
wherein the step of routing signals comprises not retransmitting any signals from the wireless communication device and not sending any externally generated signals to the wireless communication device.

12. The method of claim 11, wherein the mobile broadcast antenna includes a signal capturing module configured to receive information relevant to satisfaction of the signal control protocol and to alter a signal of the mobile broadcast antenna.

13. The method of claim 12, wherein the signal capturing module detects signal strengths from other broadcast antenna and alters a broadcast strength of the mobile broadcast antenna to be higher than the detected signal strengths.

14. The method of claim 13, wherein the signal capturing module calculates a desired signal strength difference according to a desired protection characteristic and alters the broadcast strength of the mobile broadcast antenna to satisfy the desired signal strength difference.

15. The method of claim 11, further comprising the steps of: registering the wireless communication device; and recording signal information related to the registered wireless communication device.

16. The method of claim 11, further comprising the step of registering the wireless communication device in a memory device in association with selectable metadata.

17. The method of claim 16, wherein the non-standard protocol routes signals according to the selectable metadata.

18. A system for disabling a wireless communication device using a signal capturing receiver, comprising:
a mobile broadcast antenna, configured to broadcast signals, including:
the mobile broadcast antenna is coupled to a powered vehicle;
a signal capturing module, configured to capture a signal stream from the wireless communication device; and
a signal control protocol satisfaction module, in communication with the signal capturing module, configured to satisfy a signal control protocol; and
a signal routing module, in communication with the mobile broadcast antenna, configured to route signals to and from the wireless communication device, and including:
a non-standard protocol disabling module, configured to disable the wireless communication device according to a non-standard protocol;
wherein the non-standard protocol disabling module includes a signal blocking module, configured to prevent the transmission of signals to and from the wireless communication device,
and
not sending any externally generated signals to the wireless communication device.

19. The system of claim 18, wherein the signal capturing module includes:
an information receiving module, configured to receive information relevant to satisfaction of the signal control protocol; and
a signal altering module, in communication with the information receiving module, configured to alter a signal of the mobile broadcast antenna.

20. The system of claim 19, wherein the signal capturing module includes a signal strength detection module, in communication with the signal altering module, configured to detect signal strengths from other broadcast antenna.

21. The system of claim 20, wherein the signal capture module includes a signal strength difference calculating module, in communication with the signal altering module, configured to calculate a desired signal strength difference according to a desired protection characteristic.

22. The system of claim 18, further comprising:
a registration processing module, in communication with the signal routing module, configured to register the wireless communication device in a memory device; and
a signal information recording module, in communication with the registration processing module, configured to record signal information related to the registered wireless communication device.

23. The system of claim 22, wherein the wireless communication device is registered in a memory device in association with selectable metadata.

24. The system of claim 23, wherein the non-standard protocol disabling module routes signals according to the selectable metadata.

* * * * *